(12) United States Patent
Pethick et al.

(10) Patent No.: US 12,298,156 B2
(45) Date of Patent: May 13, 2025

(54) COMPOSITE CYLINDER (71) Applicant: Crompton Technology Group, Ltd., Solihul (GB)

(72) Inventors: Jonathan David Pethick, Leicester (GB); Michael Paul Somerfield, Stoke-On-Trent (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 126 days.

(21) Appl. No.: 18/188,759

(22) Filed: Mar. 23, 2023

(65) Prior Publication Data
US 2023/0314182 A1 Oct. 5, 2023

(30) Foreign Application Priority Data

Mar. 30, 2022 (EP) ..................................... 22275039

(51) Int. Cl.
*G01D 5/22* (2006.01)
*H01F 27/28* (2006.01)
*H01F 41/064* (2016.01)

(52) U.S. Cl.
CPC ........... *G01D 5/2291* (2013.01); *H01F 27/28* (2013.01); *H01F 41/064* (2016.01)

(58) Field of Classification Search
CPC ...... G01D 5/2291; H01F 41/064; H01F 27/28
USPC ..... 324/207.11, 207.15, 207.24; 33/706, 708
See application file for complete search history.

(56) References Cited

U.S. PATENT DOCUMENTS

| | | | |
|---|---|---|---|
| 5,052,273 A * | 10/1991 | Sakaguchi | F15B 15/2846 92/5 R |
| 5,886,617 A | 3/1999 | Meloche et al. | |
| 7,436,173 B2 | 10/2008 | Riedel et al. | |
| 7,759,930 B2 | 7/2010 | Colli et al. | |
| 8,710,828 B1 | 4/2014 | Meisel | |
| 2004/0070314 A1* | 4/2004 | Yoon | H10N 30/204 310/330 |

(Continued)

FOREIGN PATENT DOCUMENTS

| | | |
|---|---|---|
| EP | 0471073 A1 | 2/1992 |
| GB | 2080632 A | 2/1982 |
| JP | S63238415 A | 10/1988 |

OTHER PUBLICATIONS

European Search Report for Application No. 22275039.0, mailed Sep. 14, 2022, 7 pages.

(Continued)

*Primary Examiner* — Vincent Q Nguyen
(74) *Attorney, Agent, or Firm* — CANTOR COLBURN LLP (57) ABSTRACT

A composite cylinder for an actuator. The cylinder includes a radially inner fibre-reinforced polymer layer defining a hollow bore, a radially outer fibre-reinforced polymer layer, a primary conductive coil, and a first and second secondary conductive coil wound between the radially inner fibre-reinforced polymer layer and the radially outer fibre-reinforced polymer layer. The first secondary conductive coil extends axially along at least a first region of the cylinder and the second secondary conductive coil extends axially along at least a second region of the cylinder, and wherein the primary conductive coil extends axially along at least a central region of the cylinder between the first region and the second region.

14 Claims, 4 Drawing Sheets

(56) References Cited

U.S. PATENT DOCUMENTS

2019/0066913 A1    2/2019  Kluesener et al.
2020/0263753 A1*   8/2020  Goldring ................. F16C 3/026

OTHER PUBLICATIONS

Patent Abstracts of Japan for JP63238415, Published: Oct. 4, 1988, 1 page.

* cited by examiner

COMPOSITE CYLINDER

CROSS-REFERENCE TO RELATED APPLICATIONS

This application claims priority to European Patent Application No. 22275039.0 filed Mar. 30, 2022, the entire contents of which is incorporated herein by reference.

TECHNICAL FIELD

This disclosure relates to a composite cylinder for an actuator, an actuator including the composite cylinder, and a linear position sensor including the actuator. This disclosure also relates to a method of manufacture of the composite cylinder.

BACKGROUND

It is known in the art to monitor linear positions of actuators within a cylinder in various applications. This monitoring is often performed using linear variable differential transformer (LVDT) sensors which convert mechanical motion or vibrations into electrical signals which represent the position of the actuator.

It is known to utilise these LVDT as a component within an actuator system. This combination of components is however expensive and can have a large combined mass. Using a direct drive LVDT can become impractical, due to Aircraft installation constraints this can be a particular problem the longer stoke of the actuator becomes. Indirect measurement of actuator stroke position leads to increased inaccuracies between actual and measured actuator position due to the number of mechanical components and interactions in the design. As actuation systems like these are used in applications which are weight sensitive it is desirable to reduce the overall mass of components.

SUMMARY

According to a first aspect a composite cylinder for an actuator is provided. The cylinder comprises: a radially inner fibre-reinforced polymer layer defining a hollow bore; a radially outer fibre-reinforced polymer layer; and a primary conductive coil, and a first and second secondary conductive coil wound between the radially inner fibre-reinforced polymer layer and the radially outer fibre-reinforced polymer layer. The first secondary conductive coil extends axially along at least a first region of the cylinder and the second secondary conductive coil extends axially along at least a second region of the cylinder, and wherein the primary conductive coil extends axially along at least a central region of the cylinder between the first region and the second region.

Optionally, the primary conductive coil, and the first and second secondary conductive coils are positioned in the same layer with the primary conductive coil positioned axially between the first secondary conductive coil and the second secondary conductive coil. For example, the first and second secondary conductive coils and the primary conductive coil may be positioned between the same layers of fibre-reinforced polymer. Optionally, the primary conductive coil, and the first and second secondary conductive coils are positioned in different layers. For example, at least one of the primary conductive coil, and the first and second secondary conductive coils may be positioned between different layers of fibre-reinforced polymer. Optionally, where a single or multiple conductive coils do not extend the whole length of a layer, the rest of the layer comprises additional fibre-reinforced sections.

Optionally, the radially inner fibre-reinforced polymer layer and the radially outer fibre-reinforced polymer layer comprise carbon fibre wound filaments, and wherein the primary conductive coil and the first and second secondary conductive coils comprise insulated wires.

Optionally, the radially inner fibre-reinforced polymer layer and the radially outer fibre-reinforced polymer layer comprise glass fibre wound filaments, and wherein the primary conductive coil and the first and second secondary conductive coils comprise non-insulated wires.

Optionally, the fibre-reinforced polymer layers comprise Polymer Matrix Composites (PMCs). PMCs can comprise fibre or polymer encased within a matrix such as resin. Optionally, the fibre-reinforced polymer layer is a Carbon Fibre Reinforced Polymer (CFRP). Optionally the matrix material comprises thermoplastic. Optionally, the matrix material is resin.

Optionally, the radially inner fibre-reinforced polymer layer comprises a plurality of layers of filament windings.

Optionally, the radially outer fibre-reinforced polymer layer comprises a plurality of layers of filament windings.

Optionally, the primary conductive coil, and the first and second secondary conductive coils each comprise first and second wire terminal ends extending axially along the composite cylinder.

Optionally, the first and second wire terminal ends of the primary conductive coil and the first and second secondary conductive coils extend radially outwards through the radially outer layer. For example, the wire terminal ends may be passed radially outwards during the winding of the radially outer layer and additionally the wire terminal ends may be threaded through high angle wound fibres of the radially outer layer. Optionally, a tab is located in or on the radially outer layer for the terminal ends to be attached for connection to other electronic components.

Optionally, the terminal ends of the primary conductive coil, and the first and second secondary conductive coils each extend from an end region of the composite cylinder. Optionally, the terminal ends extend partially along the composite cylinder for connection to external electronic components.

Optionally, the wire terminal ends extend axially along the composite cylinder between the radially inner fibre-reinforced polymer layer and the radially outer fibre-reinforced polymer layer. Optionally, the first terminal ends and the second terminal ends are wound through the radially outer fibre-reinforced polymer layer.

Optionally, the terminal ends of the first and second secondary conductive coils are connected in a series opposing configuration. In the series opposing configuration the first and second secondary conductive coils are connected so each has only one free wire terminal end, at which an output voltage may be measured. Optionally, the terminal ends of the first and second secondary conductive coils are connected externally to the composite cylinder.

According to a second aspect an actuator is provided comprising a displacement member and a composite cylinder, wherein the displacement member is configured for linear displacement within the hollow bore, and wherein the displacement member comprises a ferromagnetic section such that, when an excitation voltage is applied to the primary conductive coil, the ferromagnetic section induces a voltage in at least one of the secondary conductive coils dependent upon a position of the displacement member within the hollow bore.

According to a third aspect a linear position sensor is provided comprising an actuator and further comprising a sensor controller configured to receive an output voltage from each of the first and second secondary conductive coils, determine a differential output voltage between the first and second secondary conductive coil, and determine a linear position of the displacement member based on the differential output voltage.

It will be appreciated that any of the features of the composite cylinder described above in relation to the first aspect may be equally applied to the composite cylinder in the second and third aspect.

According to a fourth aspect a method of manufacturing a composite cylinder for an actuator is provided. The method includes: winding fibres around a mandrel to form a radially inner layer; winding conductive wire over at least a central region of the inner layer to form a primary conductive coil; winding conductive wire over at least a first region of the inner layer to form a first secondary conductive coil; winding conductive wire over at least a second region of the inner layer to form a second secondary conductive coil, wherein the central region is between the first and second regions; winding fibres over the primary conductive coil and the first and second secondary conductive coils to form a radially outer layer; and curing at least the radially inner layer and the radially outer layer.

Optionally, at least the radially inner layer and the radially outer layer are cured in a single curing step after the radially outer layer has been formed. Optionally, the single curing step further comprises curing at least one layer in between the radially inner and radially outer layer, for example an intermediate layer comprising the primary conductive coils and the first and second secondary conductive coils.

Optionally, the fibres are pre-impregnated fibres. Optionally, the method additionally comprises towing the fibres through a resin bath prior to winding. Optionally, matrix material is added directly to the wound layers, either after each individual layer has been wound or only after the radially outer layer has been wound.

Optionally, the method further comprises extending a first and second terminal end of each of the primary conductive coil, and the first and second secondary conductive coils, axially along the composite cylinder. Optionally, the method further comprises extending the first and second terminal end of each of the primary conductive coil, and the first and second secondary conductive coils radially outwards through the radially outer layer of windings. Optionally, the first and second terminal ends are extended in both an axial and radial direction. Optionally, one or more of the terminal ends may extend in an axial direction and one or more of the terminal ends may extend in a radial direction. Optionally, one or more of the terminal ends may extend in both an axial and radial direction.

Optionally, the method further comprises extending the first and second terminal ends of each of the primary conductive coil, and the first and second secondary conductive coils out of an end region of the composite cylinder. Optionally, the method further comprises extending the first and second terminal ends partially along the length of the cylinder.

Optionally, the wire terminal ends are extended axially along the composite cylinder between the radially inner layer and the radially outer layer. Optionally, the method additionally comprises passing the wire terminal ends through the radially inner layer and/or the radially outer layer.

Optionally, the method further comprises connecting the terminal ends of the first and second secondary conductive coils in a series opposing configuration.

Optionally, forming the radially inner layer comprises winding a plurality of layers of pre-impregnated fibres.

Optionally, forming the radially outer layer comprises winding a plurality of layers of pre-impregnated fibres.

It will be appreciated that any of the features of the composite cylinder described in relation to the first aspect may equally be applied to the method of the fourth aspect.

It will be appreciated that any fibre placement techniques may be used, including filament winding or braiding techniques. Resin or matrix material may be applied to the fibres at any suitable point in the process as is well known, e.g. using pre-impregnated fibres, towing fibres through resin baths during placement, or submerging the formed part in resin after fibre placement (or a combination of these techniques).

It will be appreciated that the terms "cylinder" and "cylindrical" are used herein in a general sense so encompass cylinders of various cross-sections, including circular cross-section cylinders, square cross-section cylinders or indeed any arbitrary cross-section shape cylinder. Generally, convex cross-sectional shapes are preferred to avoid or minimise fibre bridging across any channels or valleys in the shape, but such shapes are not excluded here.

It will be appreciated that the composite cylinder and method provide a simple single component piece for use in actuator systems where position monitoring is desired. This all-in-one production method allows for components to be of lower weight whilst retaining structural integrity. This is also a more efficient production technique which can be both time and cost saving which is highly beneficial.

BRIEF DESCRIPTION OF THE DRAWINGS

Certain preferred examples of this disclosure will now be described, by way of example only, with reference to the accompanying drawings, in which.

DETAILED DESCRIPTION

Figure 1:
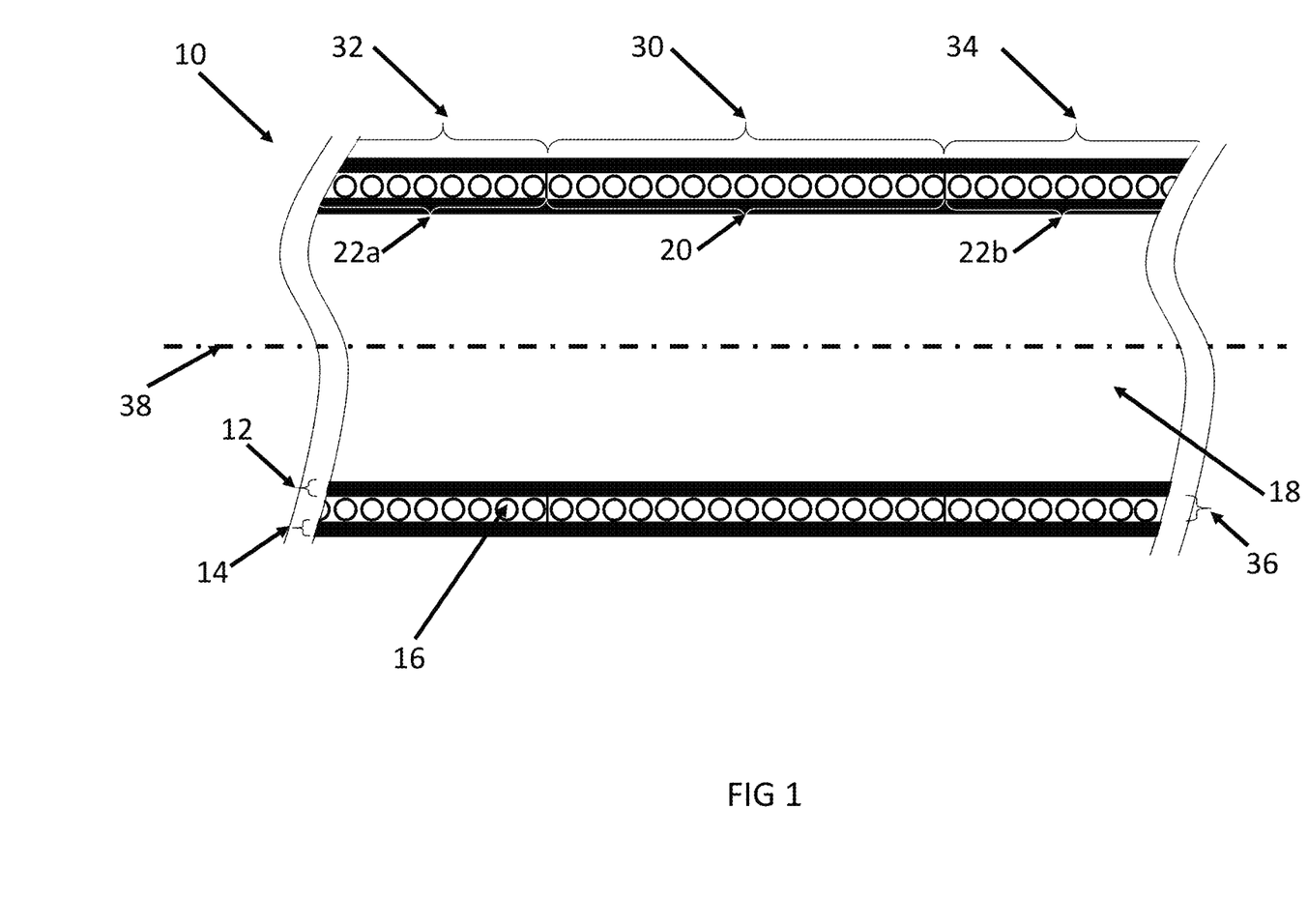
FIG. 1 shows a cross section of part of a composite cylinder.

FIG. 1 shows a cross section of a composite cylinder 10 with hollow bore 18, including a radially inner fibre-reinforced polymer layer 12, a radially outer fibre-reinforced polymer layer 14, a primary conductive coil 20 and a first and second secondary conductive coil 22a, 22b with conductive wire 16. The central axis is represented as line 38. The primary conductive coil 20 is located in a central region 30 of the composite cylinder 10 and the secondary conductive coils 22a, 22b are located in a first and second region 32, 34 of the composite cylinder 10. In this example the conductive coils 20, 22a, 22b are located in a single layer 36 between the radially inner layer 12 and the radially outer layer 14 of fibre-reinforced polymer.

As FIG. 1 shows a cross section of the composite cylinder 10, it will be understood that each component layer is wound around the whole composite cylinder 10.

The composite cylinder 10 is formed by winding consecutive layers around a mandrel (not shown). Fibres are wound around the mandrel to create layers of fibre-reinforced polymer. The fibres may include a fibre or filament coated in a matrix material, for example a carbon fibre coated in a resin matrix. In other examples, the fibres may be coated in any suitable material, for example any thermoset or thermoplastic.

First, the radially inner layer 12 is formed by winding fibres around the mandrel. After forming the radially inner layer 12, conductive wire 16 is wound over a first region 32 of the radially inner layer 12 to form a first secondary conductive coil 22a, over a central region 30 of the radially inner layer 12 to form a primary conductive coil 20, and over a second region 34 of the radially inner layer to form a second secondary conductive coil 22b. Then, the radially outer layer 14 is formed by winding additional fibres over the primary conductive coil 20 and secondary conductive coils 22a, 22b. Once the winding of each of the radially inner layer 12, primary conductive coil 20, secondary conductive coils 22a, 22b and radially outer layer is complete, the whole cylinder is cured in a single curing step.

Any fibre placement technique may be used for the winding of the fibres onto the mandrel to create the fibre-reinforced polymer. The fibre placement technique may be filament winding or braiding techniques. Resin or matrix material may be applied to the fibres at any suitable point in the process as is well known, e.g. using pre-impregnated fibres, towing fibres through resin baths during placement, or submerging the formed part in resin after fibre placement (or a combination of these techniques).

It will be appreciated that by creating a fibre-reinforced polymer for the radially inner layer 12 and the radially outer layer 14, matrix material may also disperse around the conductive wire 16 forming each of the primary conductive coil 20 and secondary conductive coils 22a, 22b. As such, after curing, the matrix material dispersed around the conductive wire 16 helps to hold the coils in position. In some examples, matrix material or resin may be directly applied to the primary and secondary conductive coils to fill the space between wire windings prior to adding the radially outer layer 14.

In the example of FIG. 1 the coils are formed in a single layer 36 with the central region 30 located axially between the first region 32 and the second region 34. As such, the primary conductive coil 20 is positioned between the first and second secondary conductive coils 22a, 22b.

In other examples the primary conductive coil 20 and first and second secondary conductive coils 22a, 22b may each be positioned in a different layer of the composite cylinder 10, or two of the coils may be positioned in the same layer and the third coil may be positioned in a different layer. If the conductive coils 20, 22a, 22b are positioned in different layers of the composite cylinder 10, each layer including a respective coil may further include windings of fibre-reinforced polymer axially adjacent the respective coil to form a complete layer.

For example, the primary conductive coil may be formed over the central region 30 of the radially inner layer 12, and fibres may be wound axially adjacent to the primary conductive coil 20 in each of the first and second regions 32, 34 to form a complete layer. The first secondary conductive coil 22a may then be wound over the fibres in the first region 32 and the second secondary conductive coil 22b may be wound over the fibres in the second region 34. Fibres may be wound in the central region 30 over the primary conductive coil 20, to fill the space between the first and second secondary conductive coils 22a, 22b. In this way, the coils are formed over two layers, with the primary conductive coil 20 positioned in a first layer, and the secondary conductive coils 22a, 22b positioned in a second layer radially outwards of the first layer.

Referring back to the example shown in FIG. 1, the primary conductive coil 20 and first and secondary conductive coils 22a, 22b are located axially next to each other in the single layer 36. In other examples the primary conductive coil 20 and the first and second secondary conductive coils 22a, 22b may axially over-lap or have a small gap between.

The radially inner layer 12 and/or the radially outer layer 14 may be a single layer of fibres. In some embodiments the radially inner layer 12 and/or the radially outer layer may be made of multiple layers of fibres. The fibres may be wound at any suitable angle to create the desired strength component, as will be apparent to a person skilled in the art.

The conductive wire 16 is wound in a manner in which the conductive coils 20, 22a, 22b will create a differential transformer.

Figure 2:
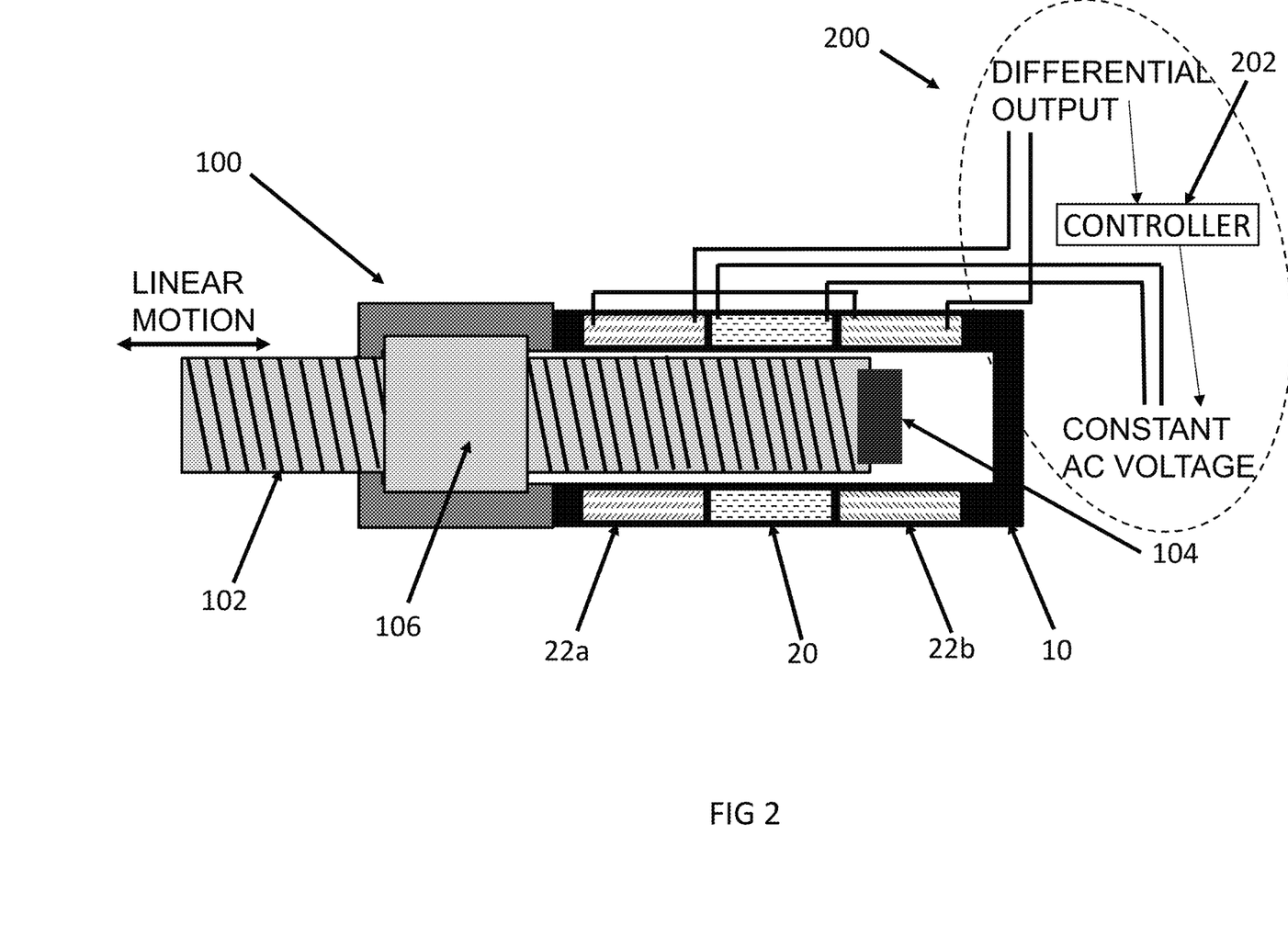
FIG. 2 shows an example actuator and linear position sensor.

FIG. 2 shows a cross section of an example of a linear position sensor integrated with an actuator 100 using a composite cylinder 10 as described with reference to FIG. 1. The linear position sensor includes a displacement member 102 with ferromagnetic section 104. Each of the primary and secondary conductive coils 20, 22a, 22b, are shown with wire terminal ends. In this example the displacement member 102 is a ball screw, and the ball screw is fed through a nut 106. The linear position and/or movement of the displacement member 102 within the hollow bore 18 of the composite cylinder 10 is measured by a sensor controller 202 of the linear position sensor.

An excitation voltage is applied to the primary conductive coil 20. The movement of the ferromagnetic section 104 within the conductive coils 20, 22a, 22b induces a measurable voltage in each of the secondary conductive coils 22a, 22b. The first terminal ends of the secondary conductive coil 22a, 22b are connected together. The terminal ends of the first and second secondary conductive coils 22a, 22b are connected in a series opposing configuration. A difference in the output voltage is measured across the second terminal ends of the secondary conductive coils 22a, 22b. This difference output voltage varies depending on the position of the ferromagnetic section 104 (and therefore the position of the whole ball screw 102) within the hollow bore 18 of the composite cylinder 10.

A sensor controller 202 receives the output voltage from each of the first and second secondary conductive coils 22a, 22b, and determines the differential output voltage between the first and second secondary conductive coil 22a, 22b. The sensor controller 202 can then determine a linear position of the displacement member 102 based on the differential output voltage.

Whilst the example of FIG. 2 shows an actuator using a ball screw 102 and a nut 106 it will be appreciated that the composite cylinder 10 can be used in various different types of linear actuators 100, where the material parameters of the composite cylinder 10 can vary depending on the desired application. For example, the linear actuator may be hydraulic, pneumatic or electro-mechanical. The section of the composite cylinder 10 with the conductive coils 20, 22a, 22b may only be the section where linear displacement is to be measured. In some examples the conductive coils 20, 22a, 22b may together extend the whole length of the composite cylinder 10, such that position measurement may be provided over the whole length of the composite cylinder 10. In other examples the conductive coils 20, 22a, 22b may together extend over part of the length of the composite cylinder 10, such that position measurement is provided over only a part of the length of the composite cylinder 10.

In some examples the fibre-reinforced polymer layers 12, 14 may include carbon fibre, and the primary and secondary conductive coils 20, 22a, 22b may be insulated wires. It will be appreciated that any suitable wire insulation may be used, so long as it is capable of maintaining integrity during the curing step. In some further examples the fibre-reinforced polymer layers 12, 14 may include glass fibre, and the primary and secondary conductive coils 20, 22a, 22b may include non-insulated wires.

Figures 3A, 3B:
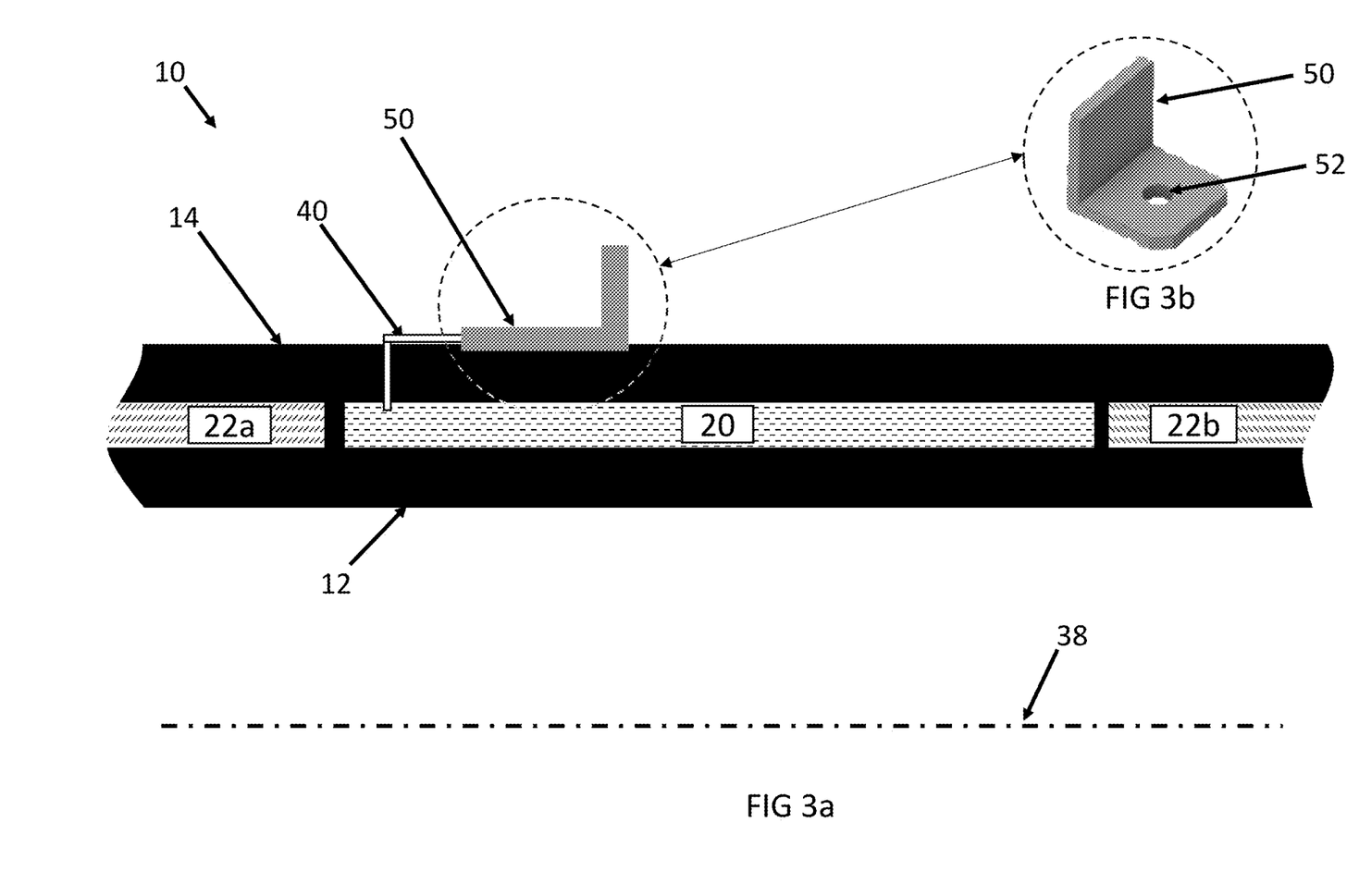
FIGS. 3a-3b shows part of a composite cylinder.

FIG. 3. shows a cross-section of part of the composite cylinder 10 showing an example of a path of a terminal end 40 from the primary conductive coil 20 to the outside of the composite cylinder 10. The terminal end 40 is shown extending out through the radially outer layer 14 and through a tab 50. The tab 50 is shown in more detail in FIG. 3b, showing a 90 tab with a hole 52.

The terminal end 40 can be fed between fibres wound at a high-angle in the radially outer layer 14. The terminal end 40 is then bent at 90 degrees to lie axially along the composite cylinder 10 prior to the curing process. The terminal end 40 is then fed through a hole 52 in the 90-degree tab 50 to create a soldered connection to the controller 200.

In some examples the tab 50 is bonded to the outer-surface of the composite cylinder 10. In some examples the tab 50 is put in place during the winding process so the fibres holds the tab 50 in place.

It will be appreciated that the terminal end 40 of the conductive coils 20, 22a, 22b are shown schematically in FIG. 2. There are various ways in which the terminal ends can be led to the outside of the composite cylinder 10. Whilst an example is shown in FIG. 3, it will be appreciated that other configurations are also possible. In some examples the terminal ends are laid to extend axially along the composite cylinder 10. In some examples the terminal ends 40 of the conductive coils 20, 22a, 22b each extend from an end region of the composite cylinder 10. In some further examples the wire terminal ends 40 extend axially along the composite cylinder 10 between the radially inner fibre-reinforced polymer layer 12 and the radially outer fibre-reinforced polymer layer 14. It will be appreciated that a combination of these configurations may be employed for each of the individual terminal ends 40 of each of the conductive coils 20, 22a, 22b, depending on their location in the composite cylinder 10, the required use of the actuator 100, the desired location of the linear position sensor 200 etc.

Figure 4:
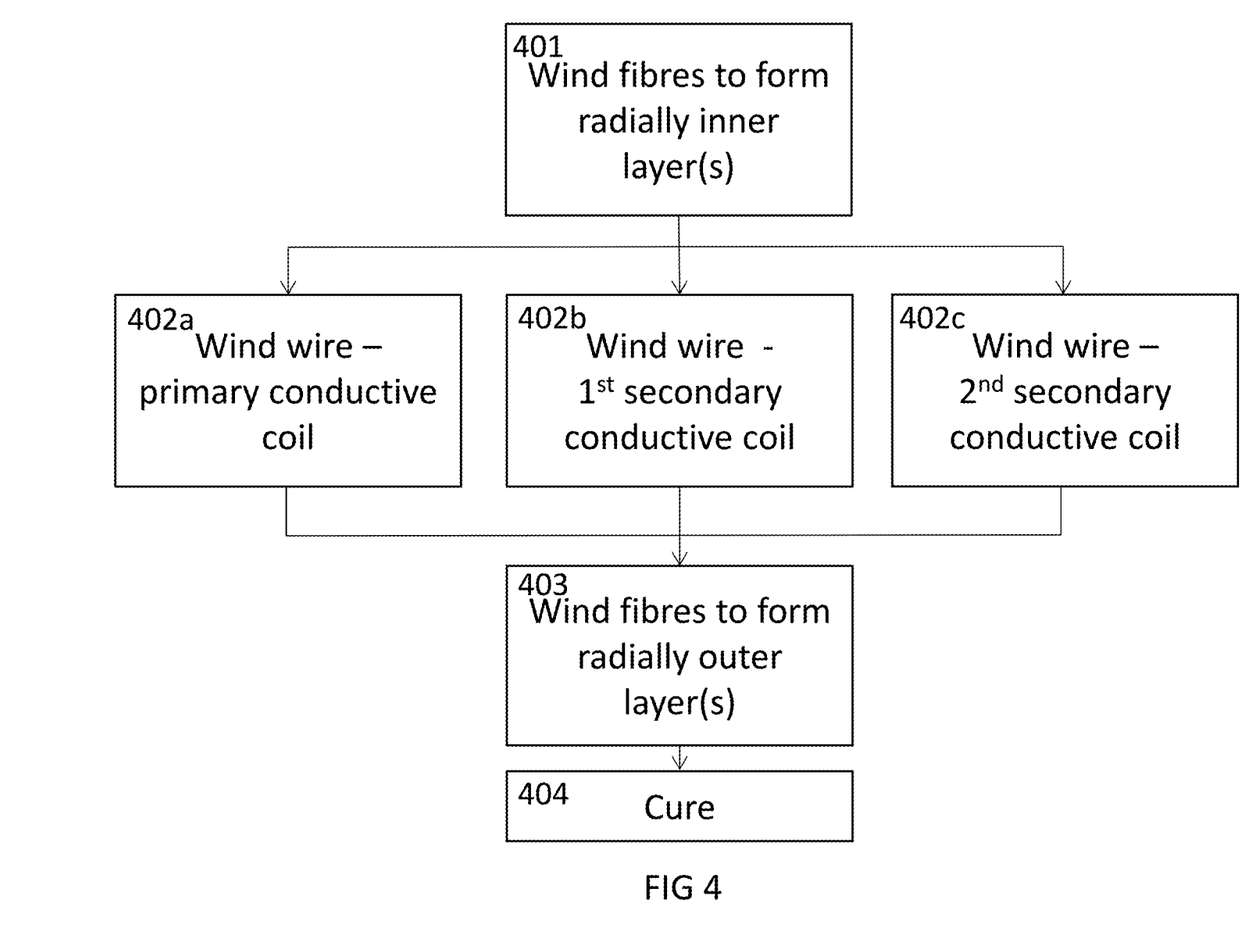
FIG. 4 shows a flow diagram representing a method for manufacturing a composite cylinder.

FIG. 4 is a flow diagram showing the method for manufacturing the composite cylinder 10. In step 401 the radially inner layer 12 is formed by winding fibres around the mandrel. Next in step 402b conductive wire 16 is wound over a first region 32 of the radially inner layer 12 to form a first secondary conductive coil 22a; in step 402a over a central region 30 of the radially inner layer 12 to form a primary conductive coil 20; and in step 402c over a second region 34 of the radially inner layer to form a second secondary conductive coil 22b. The various steps 402 can be performed in any order as dictated by the preferred arrangement of the coils for a given application. Next in step 403 the radially outer layer 14 is formed by winding additional fibres over the primary conductive coil 20 and secondary conductive coils 22a, 22b. The application of the matrix will depend on which fibre placement technique is used. If pre-impregnated fibres are used for winding, no matrix application step is required. In other examples, matrix may be applied to fibres using a towing technique prior to winding. The matrix may be applied directly onto the composite cylinder 10 during manufacture, this may be done by placing the whole part in a matrix bath. The matrix may be applied to the fibres after the winding of each fibre layer, or it may be applied to the whole part after all the winding has been completed. Finally, in step 404, the whole cylinder is cured in a single curing step.

Whilst these basic steps are represented, it will be appreciated that additional steps may be implemented in addition to those outlined in FIG. 4.

The examples described herein advantageously provide an integrated composite cylinder which can be easily used in an actuator and as part of a linear displacement sensor. The integrated manufacturing of the coils and fibre-reinforced polymer layers provides for a lighter weight component which can be desirable in numerous applications, especially in aerospace applications. By integrating the coils into the composite cylinder fewer parts are required, which can improve the ease of installation, and can reduce costs associated with linear sensors measuring actuator displacement.

Furthermore, the integration of the coils into the composite cylinder can protect the coils from wear and tear when in use. Additionally, the composite cylinder can be designed for any specific requirement with any length of the cylinder comprising the coils, this provides flexibility in location of the coils in a way which is not possible when a linear variable differential transformer is added to a cylinder of an actuator after production.

The method provides for a flexible approach to the production of a composite cylinder which can be manufactured using a variety of techniques and using a variety of materials, allowing for the composite cylinder and/or actuator and/or linear position sensor to be tailor made to any purpose.

It will be appreciated by those skilled in the art that the disclosure has been illustrated by describing one or more specific aspects thereof, but is not limited to these aspects; many variations and modifications are possible, within the scope of the accompanying claims.

The invention claimed is:

1. A composite cylinder for an actuator, wherein the cylinder comprises:
   a radially inner fibre-reinforced polymer layer defining a hollow bore;
   a radially outer fibre-reinforced polymer layer; and
   a primary conductive coil, and a first and second secondary conductive coil wound between the radially inner fibre-reinforced polymer layer and the radially outer fibre-reinforced polymer layer,
   wherein the first secondary conductive coil extends axially along at least a first region of the cylinder and the second secondary conductive coil extends axially along at least a second region of the cylinder, and wherein the primary conductive coil extends axially along at least a central region of the cylinder between the first region and the second region;
   wherein the primary conductive coil, the first secondary conductive and the second secondary conductive coil are positioned in the same layer; and wherein the primary conductive coil is positioned axially between the first secondary conductive coil and the second secondary conductive coil.

2. The composite cylinder of claim 1, wherein the radially inner fibre-reinforced polymer layer and the radially outer fibre-reinforced polymer layer comprise carbon fibre wound filaments, and wherein the primary conductive coil and the first and second secondary conductive coils comprise insulated wires.

3. The composite cylinder of claim 1, wherein the radially inner fibre-reinforced polymer layer and the radially outer fibre-reinforced polymer layer comprise glass fibre wound filaments, and wherein the primary conductive coil and the first and second secondary conductive coils comprise non-insulated wires.

4. The composite cylinder of claim 1, wherein the radially inner fibre-reinforced polymer layer comprises a plurality of layers of filament windings.

5. The composite cylinder of claim 1, wherein the radially outer fibre-reinforced polymer layer comprises a plurality of layers of filament windings.

6. The composite cylinder of claim 1, wherein the primary conductive coil, and the first and second secondary conductive coils each comprise first and second wire terminal ends extending axially along the composite cylinder.

7. The composite cylinder of claim 6, wherein the terminal ends of the first and second secondary conductive coils are connected in a series opposing configuration.

8. An actuator comprising:
a displacement member; and
a composite cylinder as recited in claim 1;
wherein the displacement member is configured for linear displacement within the hollow bore, and
wherein the displacement member comprises:
a ferromagnetic section such that, when an excitation voltage is applied to the primary conductive coil, the ferromagnetic section induces a voltage in at least one of the secondary conductive coils dependent upon a position of the displacement member within the hollow bore.

9. A linear position sensor comprising the actuator of claim 8, further comprising:

a sensor controller configured to receive an output voltage from each of the first and second secondary conductive coils, determine a differential output voltage between the first and second secondary conductive coil, and determine a linear position of the displacement member based on the differential output voltage.

10. A method of manufacturing a composite cylinder for an actuator, the method comprising:
winding fibres around a mandrel to form a radially inner layer;
winding conductive wire over at least a central region of the inner layer to form a primary conductive coil;
winding conductive wire over at least a first region of the inner layer to form a first secondary conductive coil;
winding conductive wire over at least a second region of the inner layer to form a second secondary conductive coil, wherein the central region is between the first and second regions;
winding fibres over the primary conductive coil and the first and second secondary conductive coils to form a radially outer layer, wherein the primary conductive coil, the first secondary conductive and the second secondary conductive coil are positioned in the same layer and wherein the primary conductive coil is positioned axially between the first secondary conductive coil and the second secondary conductive coil; and
curing at least the radially inner layer and the radially outer layer.

11. The method of claim 10, further comprising extending a first and second terminal end of each of the primary conductive coil, and the first and second secondary conductive coils, axially along the composite cylinder.

12. The method of claim 11, further comprising connecting the terminal ends of the first and second secondary conductive coils in a series opposing configuration.

13. The method of any of claim 10, wherein forming the radially inner layer comprises winding a plurality of layers of fibres.

14. The method of claim 10, wherein the forming the radially outer layer comprises winding a plurality of layers of fibres.

* * * * *